T. WALTON.
Globe for Lanterns.
No. 9,515. Reissued Dec. 21, 1880.
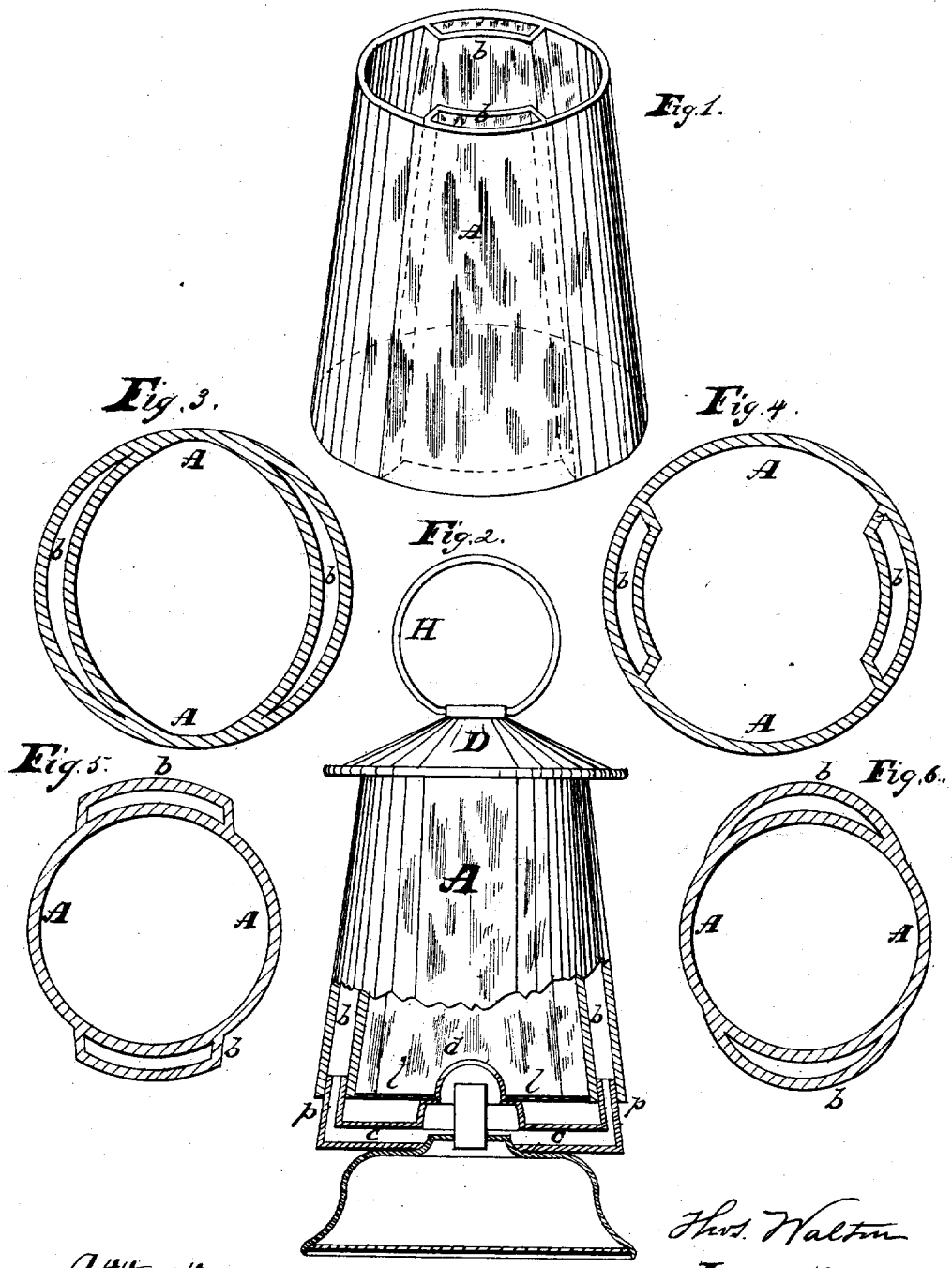
Attest:
F. W. Hanaford
A. M. Pierce
Thos. Walton
Inventor:
By Worth Ayres,
Attorney
N. PETERS, PHOTO-LITHOGRAPHER, WASHINGTON, D. C.

UNITED STATES PATENT OFFICE.

THOMAS WALTON, OF WHEELING, WEST VIRGINIA.

GLOBE FOR LANTERNS.

SPECIFICATION forming part of Reissued Letters Patent No. 9,515, dated December 21, 1880.

Original No. 201,072, dated March 5, 1878. Application for reissue filed November 4, 1880.

*To all whom it may concern:*

Be it known that I, THOMAS WALTON, of Wheeling, county of Ohio, and State of West Virginia, have invented certain new and useful Improvements in Globes for Lamps, Lanterns, &c., of which the following is a full, clear, and exact description, reference being had to the accompanying drawings, and to the letters of reference marked thereon.

Figure 1 is a perspective view of a globe or chimney constructed in accordance with my invention, the same being shown as unconnected with any portion of a lamp or lamp-top.

Fig. 2 is a partial section and elevation, illustrating one method of applying the improved chimney or globe to an ordinary hand-lantern. Figs. 3 and 4 are horizontal sections, showing the air-conducting tubes located so as to lie within the body of the globe or chimney; and Figs. 5 and 6 are similar views indicating different forms of tubes, and these upon the outside of the chimney instead of inside, as in the other figures.

Like letters of reference, wherever they occur, indicate corresponding parts in all the figures.

The object of my invention is to provide a simple and cheap globe or chimney for lamps, lanterns, and all manner of illuminating devices, which globe shall carry with it suitable conduits for conveying a supply of feed-air down to the burner for the support of combustion upon the same general principles as govern the operation of the well-known tubular lanterns and analogous illuminators.

To accomplish this the invention consists in certain novel and useful combinations or arrangements of parts and details of construction, all of which will be hereinafter first fully described, and then pointed out in the claims.

In the tubular lanterns above mentioned it has heretofore been customary to conduct the desired supply of feed-air for the support of combustion from the region of a dome or canopy over the globe down through metallic tubes to an air-chamber connected with the interior of the cone upon the burner. These tubes, being made of metal, add considerably to the expense of the lantern, and they are otherwise disadvantageous, not only for the reason that they cast an objectionable shadow, but also because they are liable to become damaged or displaced in the ordinary use of the lantern. They are also disadvantageous in that whenever the globe is removed for cleaning or lighting the lamp or filling the oil-pot the separate tubes are allowed to remain in place. To obviate these several objections and make the air-conducting tubes detachable with the globe or chimney from the base, as well as to diminish the cost of construction, I propose to form these tubes in such manner that one portion of the wall of the chimney shall make a part of the walls of the air-conducting tubes, substantially as shown in the drawings.

A is the glass globe or chimney, intended for use in connection with any style of illuminator, and *b b* are the air-conducting tubes extending down alongside of said chimney, either inside, as in Figs. 1, 2, 3, and 4, or outside, as in Figs. 5 and 6. In either case it will be observed that the wall of the chimney or globe is utilized for making one wall of each tube, by reason of which an economy of material results, and the globe and its tubes are removable together from the base of the lamp or lantern. The manner of forming the improved globe is a matter not necessary to be detailed herein, inasmuch as the process to be adopted will at once be apparent to those accustomed to working with glass.

The improved globe may be conveniently hinged or otherwise attached to the lamp, so that the latter may be easily and quickly accessible for purposes of lighting and trimming, thus avoiding the employment of springs and catches above the globe and the inconvenience of removing it from between the projecting tubes.

The globe carrying the air-feeding tubes with it, being detachable from its base, breaks the connection between the feed-conduits and the air-channel leading to the under side of the burner-cone, and the simple act of replacing the globe in place restores the connection of the tubes and said channel, thus rendering the improved device more convenient to operate than those lanterns in which the tubes are removed from the globe, and which require one operation to replace the globe and another to replace the divided tubes.

The metallic exterior tubes referred to cast an objectionable shadow, which is obviated in my improved construction by making the walls of the tubes of glass. By such construction I am enabled to produce a lantern in which no shadow will be cast by any material between the dome and the lamp. The transparent tubes permitting the passage of light, while at the same time serving to conduct air for feeding the flame, is an important feature in my invention.

The mere form or shape of the chimney and of the air-tubes is immaterial. So also is the location of the tubes with respect to the interior and exterior of the improved device. It is preferred to locate the tubes *b b* within the chimney, as indicated at Figs. 1, 2, 3, and 4. This construction is preferred because the tubes will be better protected and the symmetrical appearance of the exterior of the chimney will be preserved; but for all essential purposes of the invention the tubes might be located without the chimney, as plainly shown at Figs. 5 and 6.

The form of the dome to be placed over the globe and the form and arrangement of the lamp, together with the means of connecting the several parts, are no part of my present invention; but in order to explain how the said invention may be applied and used I have chosen a hand-lantern, as at Fig. 2, which will serve as one and a sufficient illustration.

D is the dome of the lantern, to which the handle H is connected. This dome, of course, permits the escape of some of the heated air and products of combustion, but is constructed, as such domes usually are, to permit the feed-air to enter the upper mouths of the air-feeding tubes *b b*. From these tubes the feed-air is conducted to a chamber, C, which communicates with the under side of the burner-cone *d*. Free access for external air is afforded between the two connecting-branches *p p*, and this air passes up through the foraminated plate *l* at the base of the globe in the usual manner outside of the burner-cone *d*.

As previously intimated, the invention is applicable to ordinary lamps, to gas-burners, street-lanterns, and all styles of illuminators wherein a chimney or globe is employed; but it is especially applicable for use in connection with hand-lanterns. It is designed, should occasion require it, to silver any particular portion of the improved globe after the manner adopted in connection with numerous styles of globes and chimneys.

The invention is to be distinguished from the class of chimneys wherein the air-tubes are disconnected from the body, as well as from that class wherein one chimney is located within another, either for preventing the exterior glass from cracking, as in street-lamps, or for any other purpose. In the latter form the requisite connection of parts and ease of manipulation are not afforded, and independent air-conduits are not secured, as in the present invention.

When constructed in accordance with the above description, the chimney or globe may be used without calling into play the functions of the additional tubes, and it will be found to admirably answer the several purposes, as previously stated. Its durability might be enhanced by making the article of tempered glass, which is contemplated, though not essential.

It will be observed that the independent air-feeding conduits are united and supported by the intervening portion of the wall of the chimney, which is, of course, transparent.

Having thus fully described my invention, what I claim as new, and desire to secure by Letters Patent, is—

1. The herein-described glass globe or chimney for illuminating apparatus, the same consisting of a body and air-ducts attached to and forming a part thereof, substantially as shown and described.

2. In combination with a transparent globe or chimney for illuminating apparatus, transparent tubes or conduits connected with said globe, and adapted to be removed from the lamp or lantern base together with said globe, substantially as and for the purposes set forth.

3. In combination with a lamp or lantern globe or chimney, independent air-feeding conduits connected therewith, in which one of the walls of each of said conduits is made of a portion of the wall of the chimney, substantially as described.

4. In combination with a lantern-base having a channel communicating with the under side of the burner-cone, a removable globe, and air-feeding conduits connected with said globe, substantially as shown and described.

5. In combination with a lamp or lantern globe, air-feeding conduits connected with said globe and adapted to register with the openings communicating with the channel leading to the under side of the burner-cone, substantially as shown, so that by replacing the globe in position the communication between the channel and conduits will be established, as set forth.

6. In a lamp or lantern globe, independent air-feeding conduits united and supported by the adjoining and intervening transparent section of the wall of the chimney, substantially as shown and described.

In testimony that I claim the foregoing I have hereunto set my hand in the presence of two witnesses.

THOS. WALTON.

Witnesses:
JNO. M. BROWN,
P. B. DOBBINS.